Oct. 29, 1929.   J. A. VOSKAMP   1,733,923
CONTINUOUS GRATING STRUCTURE
Filed Nov. 23, 1927
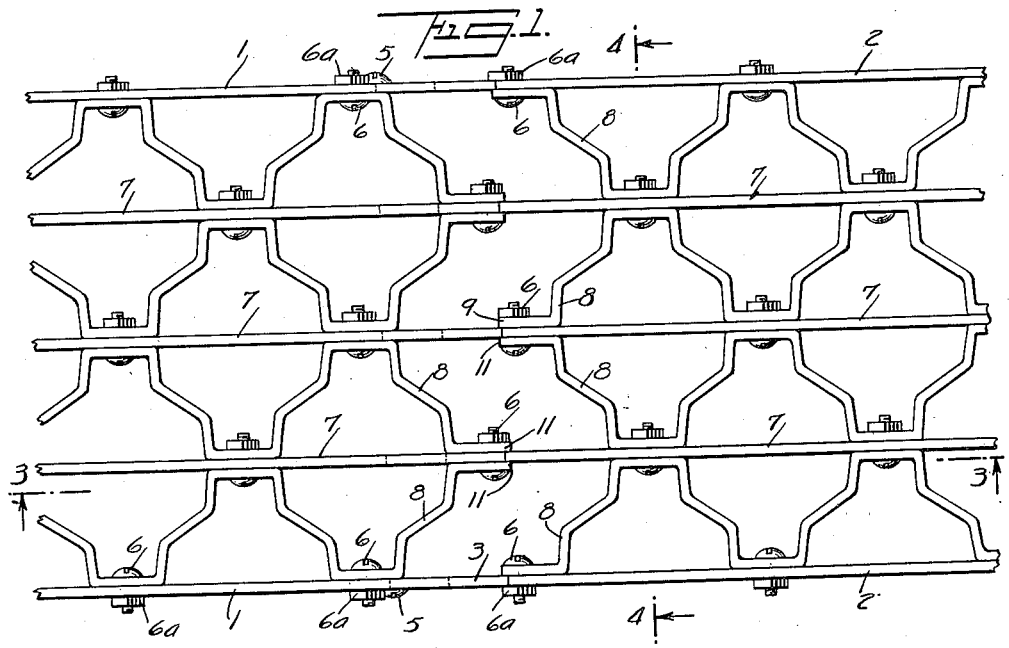
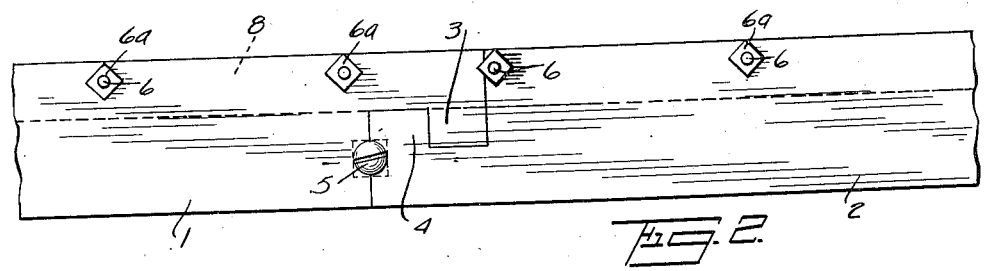
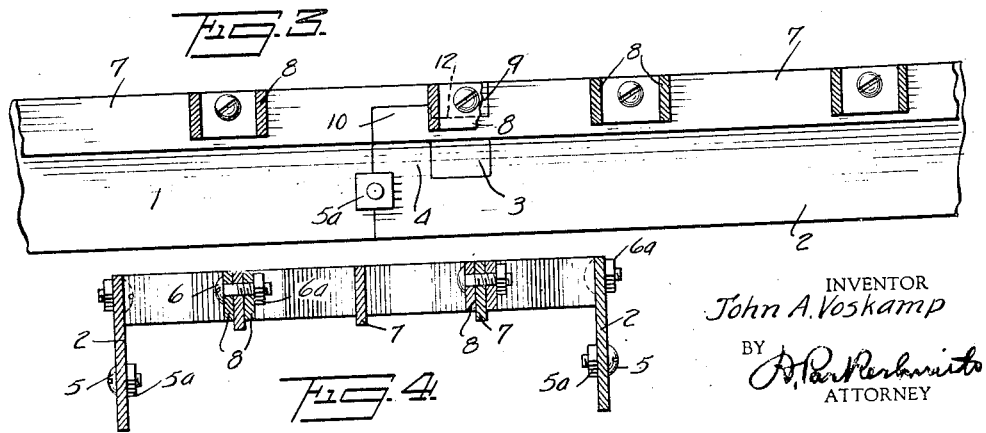
INVENTOR
John A. Voskamp
BY
ATTORNEY Patented Oct. 29, 1929

1,733,923

UNITED STATES PATENT OFFICE

JOHN A. VOSKAMP, OF NEW YORK, N. Y., ASSIGNOR TO IRVING IRON WORKS COMPANY, A CORPORATION OF NEW YORK

CONTINUOUS GRATING STRUCTURE

Application filed November 23, 1927. Serial No. 235,151.

This invention relates to gratings and particularly to those used for runways and floorings in ships, bridges and buildings. It is designed to produce a simple and secure joining of the abutting ends of consecutive panels of grating so as to produce a more or less lengthy structure of this type which appears to be continuous. Generally speaking, this is accomplished by interlocking the abutting ends of the straight bars of the various grating panels by means of cooperating hook-like portions and means for holding these interlocked elements in alignment.

The best form of apparatus embodying the invention at present known to me is illustrated in the accompanying sheet of drawings in which, Fig. 1 is a plan view of the abutting ends of two panels of grating joined in accordance with the invention;

Fig. 2 is a side elevation;

Fig. 3 is a section on line 3—3 of Fig. 1, with parts broken away, and

Fig. 4 is a cross section on line 4—4 of Fig. 1.

Throughout the drawings like reference characters indicate like parts. 1, 1, represent the side bars of the left hand panel of grating, and 2, 2, the side bars of the right hand panel. As shown, these side bars are preferably made of considerably greater depth than the reticulated structure forming the grating and connecting them. This latter structure, as shown, is preferably composed of a series of straight bars 7, 7, of considerably less depth than the bars 1 and 2, and intervening bent strips 8, 8, which, together with the fastening bolts 6 and nuts 6ª, connect the exterior bars 1, 1, and 2, 2, together. The upper edges of all the bars or strips are preferably in the same plane, although this is not absolutely necessary so far as the exterior straight bars 1 and 2 are concerned. Also preferably the straight bars 7 are a little deeper than the connecting bent strips 8, as best shown in Fig. 4.

The two panels of grating thus formed have their abutting ends connected by interlocking means, as shown in Figs. 2 and 3. The exterior bars 1 of the left hand section of grating have hook-shaped end portions 3, formed along their upper edges, and the exterior bars 2, 2, of the right hand panel have cooperating interlocking hook shaped end portions 4, 4, formed on their under portions. These two complementary hooks are interlocked, as shown in Fig. 2, and the bars 1 and 2 held in alignment by means of the short screw bolts 5, passing through the recesses formed by the registering semicircular notches in the abutting portions of the bars 1 and 2, as shown in Fig. 2, said bolts 5 cooperating with the nuts 5ª, the bolt heads and nuts overlapping the adjacent edges of the bars 1 and 2. Also the nuts 6ª on the screw bolts 6, which fasten the ends of certain of the strips 8 to the exterior bars 2, 2, overlap slightly the outer edges of the hooked portions 3, 3, as shown in Fig. 1, as do also the ends of said bent strips 8, 8. Consequently, these overlapping portions of the structure of the right hand panel firmly hold the hooked portion 3, of each bar 1, in line with its abutting bar 2, while the screw bolt 5, and nut 5ª perform a similar office for the hooked portion 4 of each bar 2, and the abutting edge of the corresponding bar 1.

The interior straight bars 7, 7, may have similar interlocking hooked ends, as shown at 9 and 10, in Fig. 3, and the abutting ends of these bars may be held in alignment at their joints by projecting ends of the bent strips 8, 8, of one panel overlapping the ends of the bar 7 of the other panel, as shown at 11 in Fig. 1, and also by the lower portions of the strips 8, overlapping a portion of the hook-shaped joint, as shown at 12 in Fig. 3.

As the result of this construction, and without the use of extra fastening means beyond the bolts 5, the ends of any two panels are firmly held together and kept in alignment or may be readily disconnected without the use of special tools.

This invention is particularly applicable to the construction of runways in engine rooms and other portions of manufacturing plants or ships, the runway being held up, either by overhead suspension means or by spaced supports beneath, so that no very great bending strains are brought upon the joints between the successive panels when moving loads pass over it.

Various changes could be made in the details of the fastenings, of grating mesh and of the supporting features of the invention, without departing from the underlying principle herein shown and explained. Other fastening means than the screw bolts shown could be employed for fastening the elements of the grating together. Grating of different mesh could be employed, and the relative proportions of the parts could be varied from those shown and described.

The grating structure thus formed may also be used advantageously as a reinforcement for concrete slabs in the manner shown in patents to Walter E. Irving No. 1,524,035, dated Jan. 27, 1925, and No. 1,526,069, dated Feb. 10, 1925, or in my pending application Ser. No. 143,808 and allowed application Ser. No. 143,809, both filed Oct. 25, 1926, or otherwise. In such composite structure the surrounding mass of set concrete also serves as a fastening means for holding the abutting ends of the straight grating bars in line one with another.

Having described my invention, I claim:

1. The combination of a plurality of panels of grating each having two deep exterior straight bars and an intermediate reticulated structure connecting said bars, the abutting ends of said deep exterior bars being cut away to form interlocking hooks, and fastening means for holding said interlocked ends in alignment one with another.

2. A combination such as defined in claim 1 in which said fastening means comprises short bolts screwed into nuts and passing through orifices formed by registering semi-circular notches cut in abutting end portions of said bars.

3. The combination of a plurality of panels of grating each composed of two exterior, deep bars and an intermediate set of straight bars and bent strips of less depth fastened together, the abutting ends of said exterior bars being cut away to form interlocking hooks, and fastening means for the abutting ends of said panels comprising short screw bolts provided with nuts and passing through orifices formed by registering notches in abutting portions of said exterior straight bars, the inner straight bars of one panel being kept in alignment with those of the adjacent panel by the projecting ends of the bent strips of one panel overlapping the ends of the straight bars of the adjacent panel.

4. The combination of a plurality of panels of grating each composed of two exterior, deep bars and an intermediate set of straight bars and bent strips of less depth fastened together, the abutting ends of said exterior bars being cut away to form interlocking hooks, and fastening means for the abutting ends of said panels comprising short screw bolts provided with nuts and passing through orifices formed by registering notches in abutting portions of said exterior straight bars, the inner straight bars of one panel being kept in alignment with those of the adjacent panel by the projecting ends of the bent strips of one panel overlapping the ends of the straight bars of the adjacent panel and the alignment of the exterior bars being further secured by the ends of the outermost bent strips and the means clamping them to the exterior bars overlapping the joints formed by abutting portions of said exterior bars.

5. The combination of a plurality of panels of grating arranged in series end to end, each panel being composed of a plurality of parallel straight bars with intervening bent strips fastened thereto, the abutting ends of the straight bars being cut away to form hooks interlocking one with another to form a connecting joint and portions of said bent strips overlapping said joints.

6. The combination of a plurality of panels of grating arranged in series end to end, each panel being composed of a plurality of parallel straight bars with intervening bent strips fastened thereto, the abutting ends of the straight bars being cut away to form hooks interlocking one with another to form a connecting joint and means for holding said abutting straight bars in alignment one with another comprising overlapping portions of said bent strips.

JOHN A. VOSKAMP.